United States Patent [19]

Pecht et al.

[11] 4,251,479
[45] Feb. 17, 1981

[54] METHOD AND APPARATUS FOR INJECTION MOLDING DATA CARRYING ELEMENTS

[75] Inventors: Adam Pecht, Downey; John F. Wegner, Los Angeles, both of Calif.

[73] Assignee: Allied Record Company, Los Angeles, Calif.

[21] Appl. No.: 52,922

[22] Filed: Jun. 28, 1979

Related U.S. Application Data

[63] Continuation-in-part of Ser. No. 933,427, Aug. 14, 1978, abandoned.

[51] Int. Cl.³ ............................................. B29D 17/00
[52] U.S. Cl. ................................... 264/106; 264/40.6; 264/328.16; 425/810
[58] Field of Search ...................... 264/40.6, 106, 107, 264/328; 425/810; 274/41 A, 42 R

[56] References Cited

U.S. PATENT DOCUMENTS

| | | | |
|---|---|---|---|
| 1,520,214 | 12/1924 | Thomson | 425/411 |
| 1,582,704 | 4/1926 | Sylvester | 425/407 |
| 2,494,974 | 1/1950 | Wadleigh | 425/385 |
| 2,681,323 | 6/1954 | Groff | 264/107 |
| 3,619,449 | 11/1971 | Berard | 264/106 |

FOREIGN PATENT DOCUMENTS

4622592 1/1965 Japan ........................................ 264/106
49-42668 11/1974 Japan ........................................ 425/810

OTHER PUBLICATIONS

Injection Molding of Gramaphone Records, G. C. Portingell, British Plastics, Mar. 1962, vol. 35, No. 3, pp. 122-124.
Rotational Injection Molding-Part III: Isostatic Polystyrene, F. L. Saunders et al., SPE Journal, vol. 25, Sep. 1969, pp. 44-48.

*Primary Examiner*—Thomas P. Pavelko
*Attorney, Agent, or Firm*—James E. Brunton

[57] ABSTRACT

A method and apparatus for injection molding styrene phonograph records and the like. Through use of special fixtures and the careful control of time, temperature and pressure during the molding process in accordance with the method of the invention, the height, width, angle and side wall configuration of the groove of monophonic, sterophonic or quadraphonic record masters can be precisely replicated in the molded records, thereby enabling high volume production of injection molded styrene records of superior quality.

14 Claims, 8 Drawing Figures

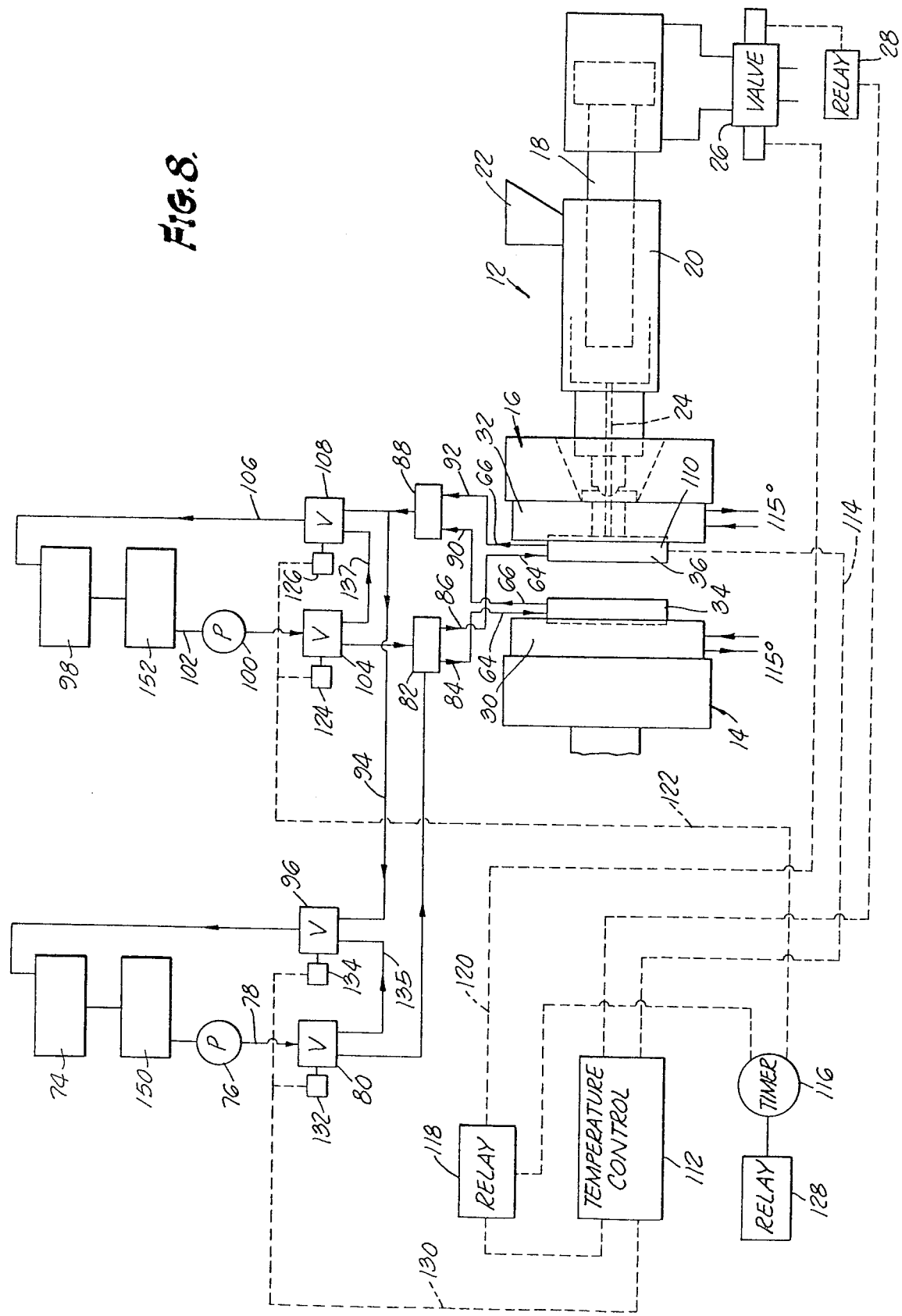

METHOD AND APPARATUS FOR INJECTION MOLDING DATA CARRYING ELEMENTS

BACKGROUND OF THE INVENTION

This is a continuation-in-part of application Ser. No. 933,427 filed Aug. 14, 1978 now abandoned.

1. Field of the Invention

The present invention relates to a method and apparatus for the production of articles molded from a moldable styrene or phenylethylene plastic material. More particularly, the invention relates to a novel method and apparatus for manufacturing highfidelity data-carrying elements such as video discs, phonograph records, and the like.

2. Discussion of the Prior Art

Numerous methods and apparatus for the manufacture of a wide variety of plastic articles by injection molding have been suggested and many types of injection molding machines are commercially available. Substantial work has been done in identifying materials suitable for injection molding and the basic techniques of injection molding are well understood. Injection molding of data-carrying elements such as phonograph records and the like, however, present special problems.

Typically, phonograph records are produced by injecting a moldable plastic material, such as polyvinyl acetochloride or styrene into a heated mold cavity defined by separable die members which are clamped together during the molding process. In practice, the moldable material is heated to a temperature range of on the order of 250° F. to 450° F. and then injected into the mold chamber which has also been heated to temperatures in the range of 150° F. to 350° F. When the molding process is completed, the mold cavity is cooled, usually by circulation of a cooling fluid in or about the dies and the moldable record is removed. Many techniques have been suggested for heating and cooling the mold cavity, including equipping the die members with spiral fluid passageways, baffles, and the like. Additionally, heating and cooling the inner and outer regions of the dies at different rates has been suggested to improve the quality of the molded record.

While various designs of die assemblies have been suggested to accomplish desired heating and cooling and to facilitate record ejection, generally the die assembly comprises first and second mating die members which are adapted to be mounted on the platens of some type of injection molding press for movement into and out of mating juxtaposition. Typically, comprising a part of the die members are removable matrices which generally consist of foils of metal having the required groove pattern of the data transcription band containing the recorded program material, formed in inverse sense on the outer surfaces thereof. As used herein, the term "data transcription band" refers to that part of the data-carrying element or record which contains the groove modulated with program material. It is the faithful, accurate and distortion-free reproduction of the groove configuration which makes the manufacture of high quality data elements such as phonograph records particularly difficult. Obviously if the groove configuration is not precisely reproduced in the record, the sounds originally transcribed cannot be replicated during playback of the record. In the production of stereophonic and quadraphonic records, this problem is greatly magnified. In such recording, the configuration of the groove is quite complex, involving continuous variations in groove depth and groove width. Additionally, the shape of undulations formed on both sides of the groove are complex and ever changing.

In the commercial production of phonograph records, and particularly in the manufacture of 12" stereophonic and quadraphonic records, the use of vinyl plastic has become standard. Even though injection molding of phonograph records using styrene material is highly desirable for a number of reasons, including significant potential cost savings, the use of styrene has heretofore largely been limited to the manufacture of the less critical 7" records. This is because, using presently known techniques, the more complex groove configuration of stereophonic and quadraphonic records simply cannot be produced by injection molding of styrene. Precise groove replication has not been possible, and all styrene records manufacture by prior art techniques exhibit a rounding of the side walls and a widening of the groove near the surface of the disc. This type of groove deformation is clearly visible in FIGS. 4 and 6 of the drawings. Because in monophonic records the groove depth remains constant and in playback the needle rides deep in the groove, this type of deformation can be tolerated, but is far from desirable. However, in stereophonic and quadraphonic records, the playback needle in following the groove moves both vertically and laterally and distortion in the groove width, height or angle will result in unacceptable sound distortion during playback. The distortion, which can be tolerated in monophonic and some less critical stereophonic records, is, therefore, totally unacceptable in critical stereophonic and quadraphonic records.

The method and apparatus of the present invention overcomes the deficiencies of previously known styrene injection molding operations, and enables reliable, large scale injection molding of high quality monophonic, stereophonic, and quadraphonic styrene records. Using the unique method and apparatus of the present invention, accurate groove replication is routinely achieved. As illustrated in FIGS. 5 and 7, groove configuration is faithfully reproduced and injection molding of a sharp, distortion-free groove in styrene is, for the first time, possible.

Practice of the method of the present invention not only enables precise replication of groove configuration, but also offers numerous other advantages. For example, by carefully controlling molding time and temperature in accordance with the invention, vastly superior material flow characteristics can be achieved. This decreases matrix wear, provides superior color dispersion, and eliminates "weld lines" common in injection molded records. Additionally, practice of the method of the invention facilitates use of scrap material and reduces mold cycle time, thereby enabling even greater cost savings.

The following prior art patents, which represent the most pertinent are known to applicants, serve to clearly illustrate the novelty of the present invention.

U.S. Pat. No. 3,619,449—Berard
U.S. Pat. No. 2,494,974—Wadleigh
U.S. Pat. No. 1,582,704—Sylvester, et al.
U.S. Pat. No. 1,520,214—Thompson

SUMMARY OF THE INVENTION

It is an object of the present invention to provide a novel method and apparatus for manufacturing data-carrying elements such as video discs, phonograph records, and the like, by precision injection molding of styrene plastic material.

More particularly, it is an object of the invention to provide a method and apparatus for molding data-carrying elements of the aforementioned character in which the shape of the groove of the data transcription band of the elements is precisely molded to exactly conform of the groove of the master upon which the data was initially transcribed. In accordance with the present invention, width, depth, and angle of groove are faithfully replicated by precise control of the injection molding process parameters of time, temperature, and pressure.

It is another object of the invention to provide a method and apparatus of the aforementioned character in which accurate replication of recorded undulations on both sides of the groove, as well as the angle and depth of the groove, is uniformly achieved regardless of the width of the groove.

It is another object of the invention to provide a method as described in the previous paragraphs in which, through close control of the temperature of the styrene during the molding process, superior material flow characteristics are obtained, thereby decreasing wear on the matrices and providing better fill of the mold cavity. This enables improvement of lead-in surface noise characteristics and virtually eliminates "weld line" defects common in injection molded records.

It is another object of the invention to provide a method and apparatus of the aforementioned character in which, by ensuring precise groove replication, high recording levels and improved tractability of the playback mechanism can be achieved.

It is still another object of the invention to provide a method and apparatus of the type described in which, by enabling precise groove formation, "break up" created by high frequency in recording material is eliminated and "echo" typically found in long-play 33⅓ rpm records is significantly reduced.

It is a further object of the present invention to provide an improved method for manufacturing phonograph records by injection molding which will substantially reduce molding time and will enable production of high quality monophonic, stereophonic, and quadraphonic records at a cost significantly lower than presently achievable using known manufacturing techniques.

It is another object of the invention to provide a unique die assembly for molding articles from styrene plastic material which, because of its novel design, permits precise temperature control of the styrene material during the injection molding process.

It is another object of the invention to provide a die assembly of the aforementioned character which is rugged, long wearing, easy to handle, and readily positioned on or removed from the platen of a standard injection molding process.

It is still another object of the invention to provide a die assembly for producing phonograph records of the type described which is provided with fluid passageways arranged proximate the die matrix for carrying fluids at elevated and reduced temperatures so as to enable precise control of temperatures across the entire surface of the matrix.

It is another object of the invention to provide a die assembly as described in the preceding paragraph in which there is embodied a sensing device such as a thermocouple which is operably interconnected with a control means for accurately regulating the flow of heating and cooling fluids throughout the die assembly.

In summary, these and other objects of the invention are achieved by a novel method and apparatus for forming data transcription bands on a record element by injection molding a moldable styrene plastic material in a mold cavity, comprising the steps of heating the styrene material to a temperature of between approximately 425° F. and approximately 475° F.; uniformly heating the mold cavity to a temperature of between approximately 140° F. and approximately 150° F.; injecting the heated styrene material into the heated mold cavity; uniformly heating the mold cavity to a temperature of between approximately 160° F. and 170° F.; uniformly cooling the mold cavity to a temperature of approximately 130° F. and approximately 140° F.; and removing the recording element from the mold cavity.

BRIEF DESCRIPTION OF THE DRAWINGS

FIG. 8 is a schematic representation of the apparatus similar to that of FIG. 1 but showing another form of the invention for molding double-sided phonograph records.

DESCRIPTION OF THE PREFERRED EMBODIMENT

Figure 1:
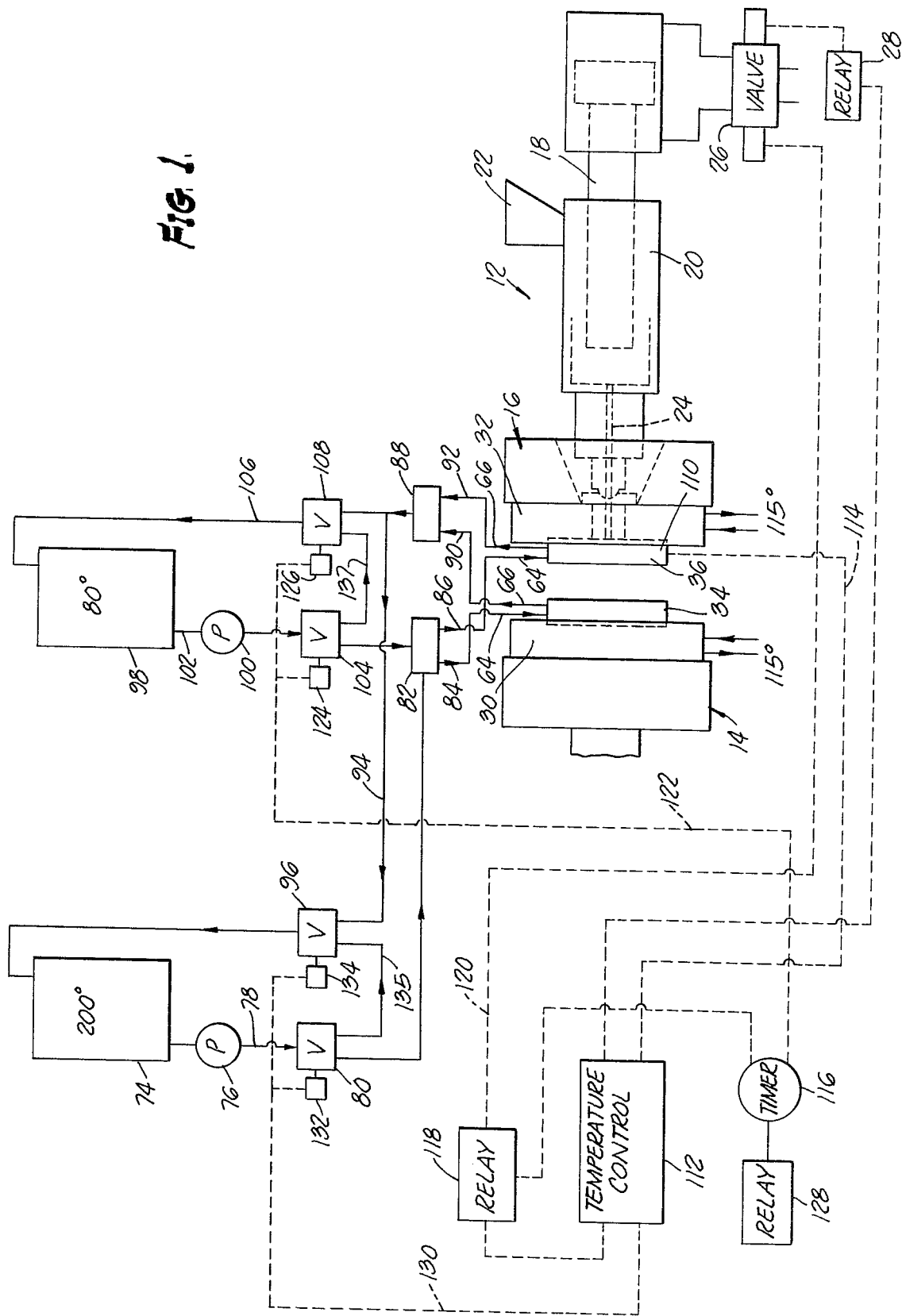
FIG. 1 is a schematic representation of the apparatus of one form of the invention for molding double-sided phonograph records.

Referring now to the drawings, and particularly to FIG. 1, the apparatus of one form of the invention is schematically represented. The numeral 12 generally designates an injection molding machine or press of standard construction. The press includes the stationary platen 16 and a movable platen 14 which is movable toward and away from stationary platen 16 by a hydraulic mechanism not shown in the drawings. Also forming a part of the injection molding machine is an injection ram 18 which is reciprocally removable within a ram cavity 20. The moldable plastic material, in this instance styrene, is introduced into the heating chamber 20 in pellet form by means of a material feed chute 22. Heaters are provided to raise the temperature of the plastic material within the press in a conventional manner to a temperature of on the order of 450° F. Reciprocation of ram 18 forces the molten plastic material through an injection passageway 24 into a mold cavity defined by die members, the construction of which will presently be described. In the embodiment shown in FIG. 1, the injection ram is operated by means of an electrically activated hydraulic valve 26 which is controlled by a relay 28. Valve 26 and relay 28, as well as all the valves, relays, and timers which comprise the system, are of standard design, are commercially available, and can readily be operably interconnected in the manner shown by those skilled in the art.

Mounted on platens 14 and 16 are mold base plates 30 and 32 respectively. These mold base plates, in turn, carry die members 34 and 36 which cooperate to form a mold cavity when moved into mating juxtaposition by advance of movable platen 14. Mold base plates 30 and 32 are heated to a temperature of on the order of 115° F. by any suitable means such as by circulating therethrough fluids are elevated temperature. The function of the mold base plates is to support and maintain die members 34 and 36 at a temperature of on the order of 115° F. When the die members are in a non-operable, spaced apart configuration prior to commencement of the injection molding process, their temperature is therefore maintained at approximately 115° F.

As shown in FIG. 1, platen 16 and plate 32 are appropriately apertured to permit injection of the molten plastic material into the mold cavity upon advance of ram 18. In a manner presently to be described, die members 34 and 36 are further controllably heated and cooled to precisely regulate the temperature of the mold cavity during the molding process.

Figure 3:
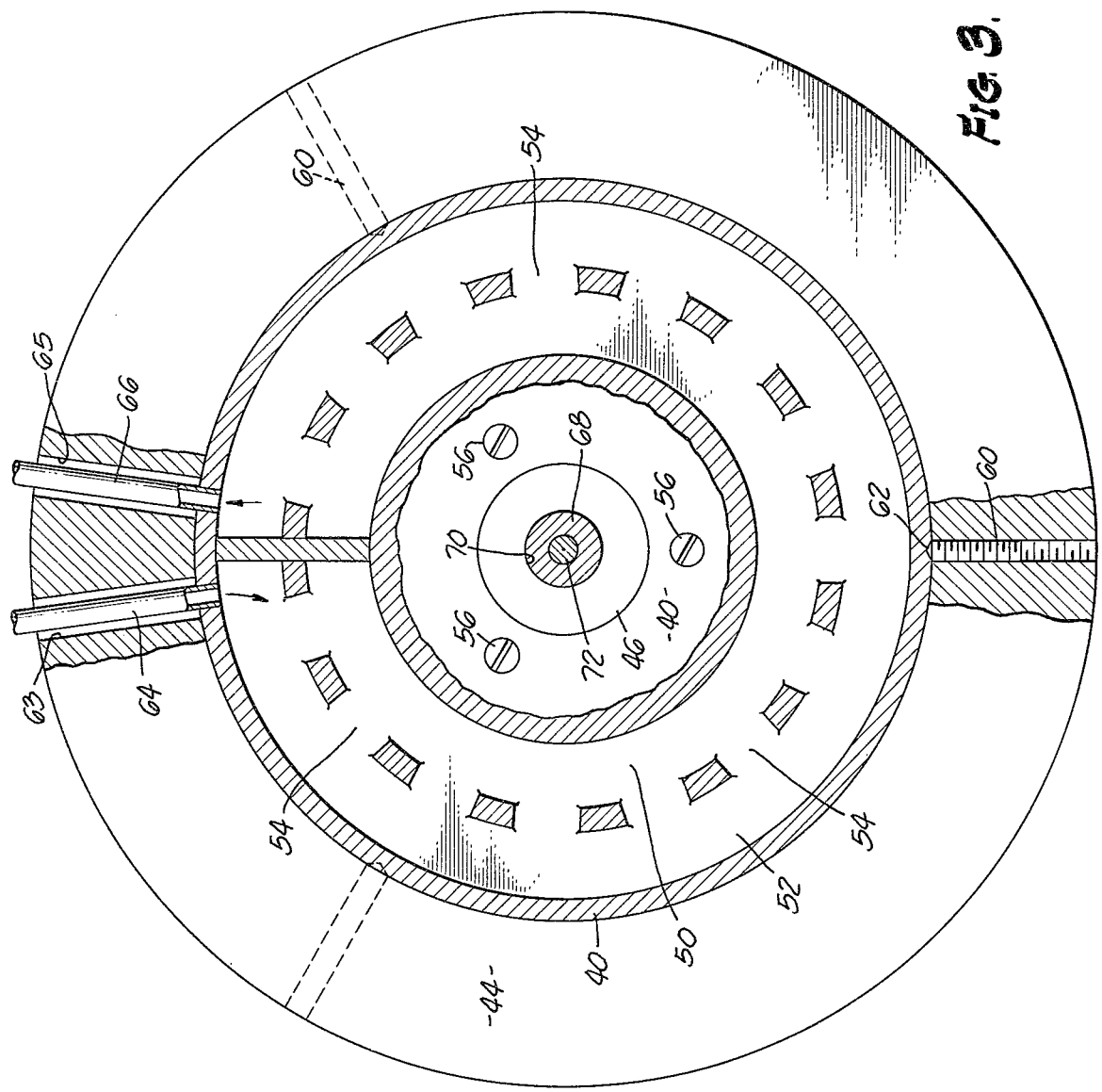
FIG. 3 is a view taken along lines 3—3 of FIG. 2 showing the internal construction of one of the die members of this form of the invention.
Figure 2:
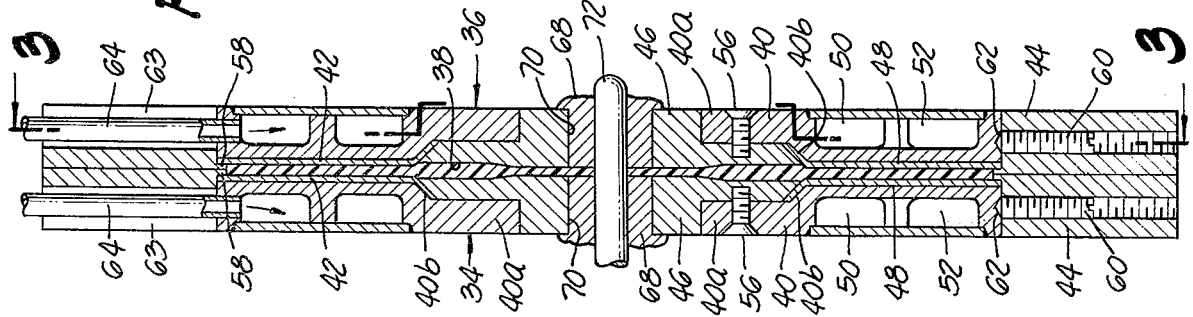
FIG. 2 is a cross-sectional view of the die members of the apparatus of this form of the invention shown in a mating relationship to form a mold cavity within which the record is molded.
Figure 4:
FIG. 4 is a photomicrograph at a magnification of 226× showing the actual appearance of a groove in a styrene record manufactured in accordance with prior art techniques.

Referring to FIG. 2, the die members 34 and 36 are shown in mating juxtaposition to define a die cavity generally designated in FIG. 2 by the numeral 38. As previously mentioned, the die members are moved into mating juxtaposition by movement of movable platen 14 to the left as the apparatus is depicted in FIG. 1. Referring also to FIG. 3, the die members of this form of the invention can be seen to be of substantially identical construction with each comprising a flat insert plate 40, a centrally apertured matrix 42, a matrix clamping outer ring 44, and a matrix clamping center member 46. Each insert plate 40 has a generally planar matrix supporting surface 48 and each is provided with at least two circumferentially extending fluid passageways 50 and 52 located interiorly of said plate immediately below and in close proximity with supporting surface 48. As shown in FIG. 3, fluid passageways 50 and 52 are interconnected by a plurality of generally radially extending ducts or passageways 54.

Turning again to FIG. 2, it can be seen that insert plate 40 has a reduced wall thickness central portion 40a which is adapted to closely receive matrix clamping center member 46. The matrix supporting surface 48 and reduced wall thickness portion 40a are interconnected by a sloping wall section 40b. To enable proper mating of the parts, matrix clamping center member 46 is provided at its outer periphery with a portion tapering at an angle corresponding to the slope of wall section 40b. Matrix 42 comprises a thin metal foil having the required groove pattern of the data transcription band of the record to be molded but formed in inverse sense on the outer surface thereof. These matrices are removably affixed to the insert plates in a manner presently to be described and are formed in a manner well known to those skilled in the art from the master upon which the data to be recorded is initially transcribed. The formation of the matrices forms no part of the present invention and the details of their construction will not be discussed. Suffice to say that the matrices present, on their outer surface in inverse sense, precisely the form of the groove of the master.

The configuration of the groove formed in the master and replicated on the record to be molded varies depending upon the type of data and the manner of its transcription. For example, in monophonic records, the groove depth remains constant and during playback of the record, the playback needle typically rides deep in the groove. In the process of stereophonic and quadraphonic recording, the width and depth of the grooves consistently change with the frequency and the level of the sound being recorded. In the playback of these types of records, the playback needle moves both vertically and laterally, following the recorded undulations formed on the sides of the grooves.

As best seen in FIG. 2, the matrix 42 is provided with a central portion which depends from the plane of the matrix at an angle generally corresponding to the slope of the peripheral portion of the center clamping member 46. When the center clamping members 46 are affixed to the insert plates by means of fasteners, such as screws 56, the depending portions of the matrices formed at their inner peripheries will be securely clamped between the clamping rings and the sloping wall sections 40b of the insert plates. To securely clamp the outer periphery of the matrices, matrix clamping outer rings 44 are provided with inwardly projecting flanges 58 adapted to clampingly engage matrices 42 proximate their outer edges. In the manner shown in FIG. 2, rings 44, in cooperation with center clamping members 46, serve to precisely center and securely hold the matrices against the matrix supporting surfaces formed on the insert plates. As indicated in FIG. 2, the diameter of the opening in rings 44 is such as to closely receive the clamping plates 40 to lockably interconnect the clamping rings and the insert plates. Threaded members 60 are threadably received in radially extending threaded apertures provided in the rings, and are adapted to seat into grooves 62 formed in the periphery of the insert plates.

Referring again to FIG. 3, it can be seen that rings 44 are slotted at 63 and 65 to receive inlet and outlet conduits 64 and 66 respectively, which conduits communicate with passageways 52 to enable circulation of fluids within passageways 50 and 52 formed in the insert plates.

Also forming a part of the die members of this form of the invention are centrally apertured spindle receiving members 68 (FIG. 2). Members 68 are closely received within a central aperture 70 formed in center members 46. Members 68 are adapted to reciprocally receive a retractable spindle 72. Spindle 72 is retracted during injection of the molten styrene and then, after the record is molded, is advanced to punch out the center hole of the record.

Referring once more to FIG. 1, the apparatus of this embodiment of the invention is shown to also comprise heating means for heating the die members 34 and 36 to a temperature of between approximately 160° F. and 170° F.; cooling means for cooling the die members;

sensor means for sensing the temperatures of the die members proximate the mold cavity; and control means operably associated with the sensor means and responsive thereto for activating the cooling means when the die members reach a predetermined elevated temperature. In the form of the invention illustrated in FIG. 1, the heating and cooling means comprise means for controllably circulating fluids at elevated temperatures and reduced temperatures within the fluid passageways 50, 52 and 54 formed in insert plates 40. More specifically, the heating means comprise a reservoir 74 for containing an appropriate heating fluid such as a mixture of water and ethylene glycol, a low viscosity oil, or the like. The temperature of the heating fluid contained within the reservoir is maintained at a temperature of on the order of 200° F. by means of standard heaters and heat exchanger units not shown, but of a type well known in the art. A pump 76 is provided to pump fluids from reservoir 74 through a conduit 78 via a control valve 80 to a manifold 82. Manifold 82 is connected by conduits 84 and 86 with the fluid inlets 64 of insert plates 40. After the heated fluid is circulated for a prescribed time through the passageways 50, 52 and 54 (FIG. 3) formed in the insert plates, it flows through the outlet passageways 66 provided in the insert plates to a second manifold 88 via conduits 90 and 92. From manifold 88, the fluid may return to reservoir 74 by means of a conduit 94 via a control valve 96.

The cooling means of this form of the invention is of similar construction and comprises a reservoir 98 for containing fluids, such as ethylene glycol or the like, normally maintained at a temperature of on the order of 80° F. The fluid contained within reservoir 98 is maintained at the desired temperature by means of heat exchange units not shown, but of a type well known in the art.

A pump 100 is provided to pump fluids from reservoir 98 through a conduit 102 via a control valve 104 to manifold 82. As previously mentioned, manifold 82 is interconnected with insert plates 40 so as to permit a flow of the fluid from the reservoir through the passageways formed in the insert plates and then to manifold 88. As will be discussed in greater detail in the section which follows entitled "Operation", during the cooling cycle of the process, control valve 96 is closed so that the cooling fluid will flow from manifold 88 back to the cooling reservoir 98 through a conduit 106 via a control valve 108 which is open during the cooling cycle.

The sensor means of this form of the invention comprises a thermocouple 110 which is operably interconnected with die member 36 for sensing the temperature of the mold cavity during the injection molding process. Thermocouple 110 is interconnected with a temperature control unit 112 by means of a thermocouple wire 114. Temperature control unit 112, which is responsive to signals generated by thermocouple 110, comprises a part of the control means of the invention, the operation of which will presently be described.

Also comprising a part of the control means of this form of the invention is a timer 116 which is operably interconnected with a relay 118 which, in turn, is operably interconnected by line 120 to valve 26 of the injection molding machine. Timer 116 is also operably interconnected by line 122 with relays 124 and 126 which are adapted to operate valves 104 and 108 respectively. Additionally, timer 116 is interconnected with an automatic signal clamp relay 128, the function of which will presently be described. As illustrated in the drawings, temperature control unit 112 is suitably interconnected by line 130 with relays 132 and 134 which are adapted to operate valves 80 and 96 respectively.

With the various components are previously described interconnected in the manner schematically shown in FIG. 1, and with the system connected to an appropriate source of electrical energy, the apparatus of the invention is in an operable configuration.

OPERATION

After the appropriate matrices 42 have been clamped into position on the insert plates 40, the die members are brought into mating juxtaposition by movement of platen 14 to the left of the position shown in FIG. 1. Alignment of the mating die members with respect to each other is insured by alignment means such as guide studs, or the like, which are not shown, but are of a type normally provided on commercially available injection molding machines. At the start of the initial operating cycle, heating members 30 and 32 are at a temperature of 115° F. and the fluid inlets and outlets of the insert plates are suitably interconnected with manifolds 82 and 88 by flexible fluid conduits. The fluid contained in reservoir 74 is at a temperature of on the order of 200° F. and the fluid contained in reservoir 98 is at a temperature of on the order of 80° F.

Prior to commencement of operations, pumps 76 and 100 are actuated and timer 116 is set. To begin the injection molding cycle, the start switch of the injection molding machine is turned to full automatic. This causes energization of relay 128, timer 116, and, in turn, relay 118. Next, temperature control unit 112 energizes relays 132 and 134 which operates valves 80 and 96 to permit fluid to flow from reservoir 74 to manifold 82. From this manifold, the fluid at elevated temperature flows through conduits 84 and 86 into the passageways formed in the insert plates, and then into manifold 88 in the manner previously described. Valve 108 being closed, the fluid will flow through conduit 94 from manifold 88 back to reservoir 74 via valve 96. Circulation of the heated fluid through the insert plates will continue in this manner until thermocouple 110 senses that the mold cavity has reached a temperature of between approximately 140° F. and approximately 150° F. and, ideally, a temperature of approximately 145° F. When this temperature is reached, the thermocouple will transmit a signal to the temperature control unit 112 which, in turn, will energize relay 28. Relay 28 then activates valve 26 of the injection molding machine, causing the advance of ram 18 and the injection into the mold cavity of styrene which has been heated to a temperature of approximately 450° F. The circulation of the fluid at elevated temperatures through the insert plates, coupled with the introduction into the mold cavity of the molten styrene, will, of course, cause the temperature of the mold cavity to rise. When the thermocouple senses that the temperature of the mold cavity has reached a temperature of between approximately 160° F. and approximately 170° F., and preferably 165° F., a signal will be transmitted to the temperature control unit 112. Ideally, the time period for the mold cavity to reach this temperature range is between five and seven seconds. The temperature of the fluid, the rate of fluid flow, and the configuration of the insert plates is, therefore, specifically selected to meet this requirement. Upon receipt of the signal from the thermocouple, the temperature control unit will de-energize relay 132, causing operation of valve 80 so as to stop the flow of heated fluid to manifold 82. At this point in the cycle, fluid will flow from valve 80 through conduit 135 back to reservoir 74 via the open side of valve 98.

At the completion of the injection cycle, valve 26 reverses, which causes retraction of ram 18. Simultaneously, relay 118 is energized which, in turn, energizes timer 116 as well as relays 124 and 126. Energization of these relays activates valves 104 and 108 to permit the flow of cooling fluid from reservoir 98 into manifold 82. The cooling fluid will now flow from manifold 82 through the passageways formed in the insert plates and into manifold 88 in the same manner as did the heated fluid and will, of course, controllably cool the mold cavity. Valve 96 being closed, cooling fluid will flow from manifold 88 back to reservoir 98 via valve 108. For certain applications, it is desirable to maintain the temperature of the mold cavity at approximately 165° F. for a period of one to three seconds prior to starting the cooling cycle. This can be accomplished by programming the desired delay time into the control means of the apparatus.

After the expiration of a predetermined period of time from the start of flow of the cooling fluid, preferably on the order of eight seconds, timer 116 will de-energize relays 124 and 126, operating valves 104 and 108 so as to stop the flow of cooling fluid from the reservoir through the fluid passageways formed in the insert plates. At this point in the cycle, the cooling fluid will flow through conduit 137 back to reservoir 98 via valve 108. Simultaneously with stopping the flow of cooling fluid through the insert plates, valves 80 and 96 will be operated to once again start the flow of heating fluid to the insert plates. Approximately three seconds later, platen 14 will be retracted and the record will be ejected from the mold cavity. The die members will then be moved back into mating juxtaposition and the injection process repeated.

Figure 5:
FIG. 5 is a photomicrograph at 266× showing the configuration of the groove in a styrene record injection molded in accordance with the method of the present invention, showing the markedly superior groove shape and definition.
Figure 6:
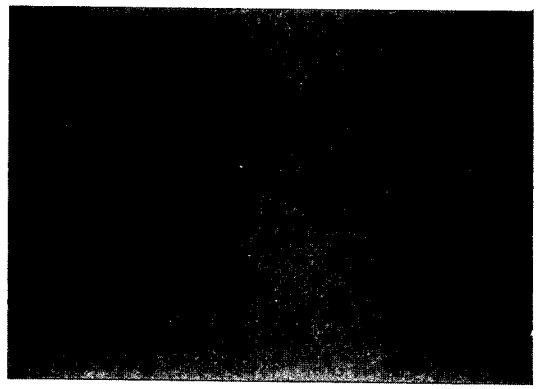
FIG. 6 is a photomicrograph similar to the photomicrograph of FIG. 4, but at 160×, showing the cross-sectional appearance of a groove of a styrene record manufactured by prior art techniques.
Figure 7:
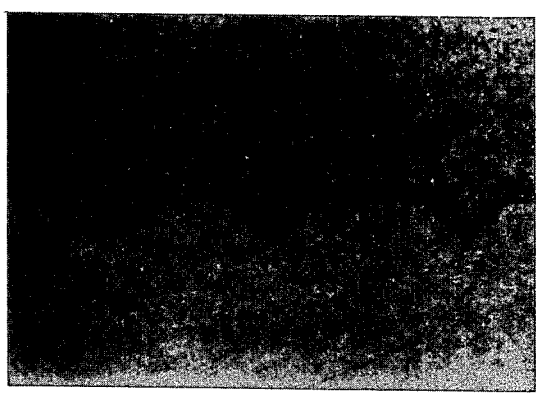
FIG. 7 is a photomicrograph similar to FIG. 5, but at 160× showing the cross-sectional appearance of the groove of a styrene record injection molded in accordance with the method of the present invention, and clearly illustrating the greater sharpness of groove definition and the elimination of rounding of the upper side walls of the groove.

The superior quality of styrene records manufactured by the aforementioned method and apparatus is vividly illustrated in FIGS. 4-7 of the drawings. By carefully controlling the injection molding process parameters in the manner just described, groove character and definition is markedly improved. For example, as shown in FIG. 7, the rounding of the upper side walls of the groove as illustrated in FIG. 6 is eliminated. Additionally, as shown in FIG. 5, undulations formed on the side walls are clearly defined and faithfully reproduced. In summary, the novel method and apparatus of the invention as herein described for the first time enables volume production of injection molded styrene records of the high quality shown in FIGS. 5 and 7.

Another form of the apparatus of the present invention for accomplishing the method of the invention is illustrated in FIG. 8. This embodiment of the apparatus of the invention is particularly adapted for use in injection molding of acrylic resins and other plastic materials with relatively high melting temperatures, but may also be used in injection molding of sytrene. Acrylic resins, as for example lucite, are formed by polymerizing esters of acrylic and or methacrylic acid. Said resins are particularly useful in the manufacture of video discs and the like.

The apparatus shown in FIG. 8 is substantially identical to that shown in FIG. 1 and like numbers are used in FIG. 7 to identify like elements. The principal difference between the apparatus shown in FIG. 1 and in FIG. 8 concerns the means for heating and cooling the die members. Because higher fluid temperatures are needed to heat the die members and lower fluid temperatures are needed to cool them, fluid heating means and fluid chilling means are required.

In the form of the invention illustrated in FIG. 8, the heating and cooling means also comprise means for controllably circulating fluids at elevated temperatures and reduced temperatures within the fluid passageways 50, 52 and 54 formed in insert plates 40. More specifically, the heating means of this embodiment comprises fluid heating means 150 for heating an appropriate heating fluid such as water maintained in a high pressure environment, or low viscosity oil. Means 150 may comprise an electrically heated vessel, a gas heated vessel or various other type of fluid heaters well known to those skilled in the art. For certain applications means 150 may also comprise a steam generator for applications wherein it is desirable to heat the die member with live steam.

Where water under pressure, or oil, is used as the heating fluid, a pump 76 is provided to pump fluids from heating means 150 through a conduit 78 via a control valve 80 to a manifold 82. Manifold 82 is connected by conduits 84 and 86 with the fluid inlets 64 of insert plates 40. After the heated fluid is circulated for a prescribed time through the passageways 50, 52 and 54 (FIG. 3) formed in the insert plates, it flows through the outlet passageways 66 provided in the insert plates to a second manifold 88 via conduits 90 and 92. From manifold 88, the fluid may return to reservoir 74 by means of a conduit 94 via a control valve 96.

Depending upon the plastic material being injection molded, the temperature of the heating fluid can be raised by the heating means to temperatures of between approximately 170° F. to approximately 365° F.

The cooling means of this form of the invention is of similar construction to that previously described and comprises a reservoir 98 for containing fluids, such as ethylene glycol or the like. Because of the higher fluid temperatures being used to heat the die members it is also necessary in this embodiment to provide a fluid chiller unit 152 between reservoir 98 and pump 100. Chiller unit 152 is adapted to rapidly cool the operating fluid to temperatures as low as 80° F.

As in the previously described embodiment of the invention, pump 100 is provided to continuously urge fluid flow to manifold 82 through a control valve 104. Manifold 82 is interconnected with insert plates 40 so as to permit a flow of the fluid from the chiller unit through the passageways formed in the insert plates and then to manifold 88. As will be discussed in greater detail in the section which follows entitled "Operation", during the cooling cycle of the process, control valve 96 is closed so that the cooling fluid will flow from manifold 88 back to the cooling reservoir 98 through a conduit 106 via a control valve 108 which is open during the cooling cycle.

The sensor means of this form of the invention also comprises a thermocouple 110 which is operably interconnected with die member 36 for sensing the temperature of the mold cavity during the injection molding process. Thermocouple 110 is interconnected with a temperature control unit 112 by means of a thermocouple wire 114. Temperature control unit 112, which is responsive to signals generated by thermocouple 110, comprises a part of the control means of the invention, the operation of which will presently be described.

The control means of the form of the invention shown in FIG. 8 is identical in construction and operation to that shown in FIG. 1 and previously described herein.

OPERATION OF ALTERNATE FORM

In operating the apparatus of this embodiment of the invention, the die members 34 and 36 are brought into mating juxtaposition by movement of platen 14 to the left of the position shown in FIG. 1. At the start of the initial operating cycle, members 30 and 32 are at an ambient starting temperature of between about 115° F. and about 140° F. and the fluid inlets and outlets of the insert plates are suitably interconnected with manifolds 82 and 88 by flexible fluid conduits.

Prior to commencement of operations, pumps 76 and 100 are actuated, the fluid heating and chilling units are actuated and timer 116 is set. To begin the injection molding cycle, the start switch of the injection molding machine is turned to full automatic. This causes energization of relay 128, timer 116, and, in turn, relay 118. Next, temperature control unit 112 energizes relays 132 and 134 which operates valves 80 and 96 to permit fluid to flow from heating unit 150 to manifold 82. From this manifold, the fluid at elevated temperature flows through conduits 84 and 86 into the passageways formed in the insert plates, and then into manifold 88 in the manner previously described. Valve 108 being closed, the fluid will flow through conduit 94 from manifold 88 back to reservoir 74 via valve 96. Circulation of the heated fluid through the insert plates will continue in this manner until thermocouple 110 senses that the mold cavity has reached a predetermined temperature selected based upon the type of material being used. For example, when styrene or acrylic resins are being used the operating temperature range can vary between approximately 140° F. and approximately 325° F. When the predetermined temperature is reached, the thermocouple will transmit a signal to the temperature control unit 112 which, in turn, will energize relay 28. Relay 28 then activates valve 26 of the injection molding machine, causing the advance of ram 18 and the injection into the mold cavity of the plastic material being injection molded, which material has been heated to a temperature of at or above the melting point of the material. The circulation of the fluid at elevated temperatures through the insert plates, coupled with the introduction into the mold cavity of the molten material will, of course, cause the temperature of the mold cavity to rise. When the thermocouple senses that the temperature of the mold cavity has reached a predetermined temperature of between approximately 170° F. and approximately 325° F., a signal will be transmitted to the temperature control unit 112. The temperature of the fluid, the rate of fluid flow, and the configuration of the insert plates is, therefore, specifically selected to meet this requirement. Upon receipt of the signal from the thermocouple, the temperature control unit will de-energize relay 132, causing operation of valve 80 so as to stop the flow of heated fluid to manifold 82. At this point in the cycle, fluid will flow from valve 80 through conduit 135 back to reservoir 74 via the open side of valve 98.

At the completion of the injection cycle, valve 26 reverses, which causes retraction of ram 18. Simultaneously, relay 118 is energized which, in turn, energizes timer 116 as well as relays 124 and 126. Energization of these relays activates valves 104 and 108 to permit the flow of cooling fluid from chiller unit 152 into manifold 82. The cooling fluid will now flow from manifold 82 through the passageways formed in the insert plates and into manifold 88 in the same manner as did the heated fluid and will, of course, controllably cool the mold cavity. Valve 96 being closed, cooling fluid will flow from manifold 88 back to reservoir 98 via valve 108.

After the expiration of a predetermined period of time from the start of flow of the cooling fluid, timer 116 will deenergize relays 124 and 126, operating valves 104 and 108 so as to stop the flow of cooling fluid from the reservoir through the fluid passageways formed in the insert plates. At this point in the cycle, the cooling fluid will flow through conduit 137 back to reservoir 98 via valve 108. Simultaneously with stopping the flow of cooling fluid through the insert plates, valves 80 and 96 will be operated to once again start the flow of heating fluid to the insert plates. Approximately three seconds later, platen 14 will be retracted and the record will be ejected from the mold cavity. The die members will then be moved back into mating juxtaposition and the injection process repeated.

When the above described process is used to manufacture video discs, an acrylic resin such as lucite may be used. In such an application the heating fluid being provided to the insert plates is maintained at a temperature of approximately 365° F. and the mold cavity is heated to a temperature range of between approximately 170° F. and approximately 325° F. in a time of approximately 5 to 7 seconds. To cool the insert plates after injection of the molten acrylic into the mold cavity fluid at a temperature of between approximately 50° F. and 80° F. is circulated through the insert plates. Of course, the lower the temperature of the fluid the faster will be the cooling rate and the higher the temperature the longer will be the cooling rate. In this regard, it is to be noted that when styrene is used as the molding material in conjunction with this alternate form of the apparatus, the mold cavity may be heated to temperatures higher than those previously described, that is about 160° F. to about 170° F. However, when higher temperatures are used, as for example up to about 170° F. to about 300° F., a longer time period is necessary to properly cool the molds making such a method undesirable for the continuous, high volume production of phonograph records. If the molds are cooled too rapidly by using very cold cooling fluids, warpage, poor groove configuration and other undesirable product degradation may result. Using acrylic resins, a satisfactory cooling period is between six and ten seconds.

When using acrylic resins and like materials for injection molding of video discs and the like, markedly superior groove character and definition is achieved using the apparatus of FIG. 8 and the higher temperature processing parameters just described.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

We claim:

1. A method of forming data transcription bands comprising a multiplicity of grooves on a record element by injection molding a moldable styrene plastic material at elevated temperature in a mold cavity at elevated temperature having the required groove pattern of the data transcription bands, comprising the steps of:

(a) heating the styrene material to a temperature of between approximately 425° F. and approximately 475° F.;

(b) uniformly heating the mold cavity to a temperature of between approximately 140° F. and approximately 150° F.;

(c) maintaining the temperature of said material between approximately 425° F. and approximately 475° F. and injecting said heated styrene material into the heated mold cavity;

(d) uniformly heating the mold cavity to a temperature of between approximately 160° F. and 170° F. to cause the styrene material to flow uniformly throughout the mold cavity;

(e) uniformly cooling the mold cavity to a temperature of between approximately 130° F. and approximately 140° F. whereby the shape of the data transcription bands on the record element will precisely conform to the shape of the groove pattern of the mold, the width, depth and angle of the grooves of the groove pattern of the mold being precisely and faithfully replicated on the record element; and (f) removing the recording element from the mold cavity.

2. A method as defined in claim 1 in which subsequent to the injection of said heated styrene material, the mold cavity is heated to a temperature of between approximately 160° F. and approximately 170° F. in a time period of between approximately five and seven seconds.

3. A method as defined in claim 2 in which subsequent to said mold cavity reaching a temperature of between approximately 160° F. and approximately 170° F., said mold cavity is uniformly cooled to a temperature of between approximately 130° F. and approximately 140° F. in a time period of approximately eight seconds.

4. A method as defined in claim 3 in which said mold cavity is maintained at a temperature of between approximately 160° F. and approximately 170° F. for a period of time of on the order of two seconds prior to starting the cooling of said mold cavity.

5. A method as defined in claim 2 in which the temperature of the mold cavity is maintained at a temperature of on the order of 115° F. prior to commencement of heating step wherein the mold cavity is heated to a temperature of between approximately 140° F. and approximately 150° F.

6. A method of molding phonograph records having a precisely formed data transcription band by injection molding a moldable styrene plastic material in a mold cavity formed between matrices having the required groove pattern of the transcription band formed in inverse sense on the outer surfaces thereof, comprising the steps of:

(a) uniformly heating the mold cavity to a temperature of approximately 140° F.;

(b) heating the styrene material to a temperature of approximately 450° F.;

(c) maintaining the temperature of said styrene material at approximately 450° F. and injecting it into the heated mold cavity;

(d) uniformly heating the mold cavity to a temperature of approximately 165° F. in a time period of on the order of five seconds;

(e) maintaining the temperature of said mold cavity at approximately 165° F. for a time period of on the order of two seconds;

(f) uniformly cooling the mold cavity to a temperature of approximately 135° F., in a time period of on the order of six seconds; and (g) removing the molded record from the mold cavity.

7. A method as defined in claim 6 in which said mold cavity is heated by a fluid at an elevated temperature of on the order of 200° F. and cooled by a fluid at a lowered temperature of on the order of 80° F.

8. A method of molding stereophonic and quadraphonic phonograph records having a precisely formed data transcription band by injection molding a moldable styrene plastic material in a mold cavity formed between matrices having the required groove pattern of the transcription band formed in inverse sense on the outer surfaces thereof, comprising the steps of:

(a) uniformly heating the mold cavity to a temperature of between approximately 140° F. and approximately 150° F.;

(b) heating the styrene material to a temperature of between approximately 425° F. and approximately 475° F.;

(c) injecting said heated styrene material into the heated mold cavity;

(d) uniformly heating the mold cavity to a temperature of between approximately 160° F. and approximately 170° F. in a time period of between approximately five and seven seconds to cause the styrene material to flow uniformly between the matrices;

(e) uniformly cooling the mold cavity to a temperature of between approximately 130° F. and approximately 140° F. in a time period of approximately eight seconds whereby the shape of the groove pattern of the data transcription band precisely conforms to the shape of the groove pattern formed in inverse sense on the matrices, the width, depth and angle of the grooves of the groove pattern being faithfully replicated.

9. A method as defined in claim 8 in which the temperature of the mold cavity is maintained at a temperature of on the order of 115° F. prior to commencement of heating step wherein the mold cavity is heated to a temperature of between approximately 140° F. and approximately 150° F.

10. A method of continuously molding phonograph records having a precisely formed data transcription band by injection molding a moldable plastic material in a mold characterized by having cooperating die members including matrices defining a closed mold cavity and having the required groove pattern of the transcription band formed in inverse sense on the outer surfaces thereof said die members having fluid passageways formed thereon proximate said groove pattern, comprising the steps of:

(a) circulating fluid at an elevated temperature of about 200° F. through said fluid passageways of said die members to uniformly heat the mold cavity to a temperature of approximately 145° F.;

(b) heating the styrene material externally of said die members to a temperature of approximately 450° F.;

(c) maintaining the temperature of said styrene material at approximately 450° F. and injecting it into the heated mold cavity;

(d) uniformly heating the mold cavity to a temperature of approximately 165° F. in a time period of on the order of five seconds;

(e) maintaining the temperature of said mold cavity at approximately 165° F. for a time period of on the order of two seconds;

(f) injecting fluid at a temperature of about 80° F. into said fluid passageways of said die members to uniformly cool the mold cavity to a temperature of approximately 135° F. in a time period of on the order of six seconds;

(g) stopping the flow of cooling fluid and injecting fluid at an elevated temperature of about 200° F. into said fluid passageways; and (h) removing the molded record from the mold cavity.

11. A method of molding video discs having a precisely formed data transcription band by injection molding a moldable acrylic resin plastic material in a mold cavity formed between matrices having the required groove pattern of the transcription band formed in inverse sense on the outer surfaces thereof, comprising the steps of:

(a) uniformly heating the mold cavity to a temperature greater than about 140° F.;

(b) heating the acrylic resin material to a temperature of at or about the melting temperature of said material;

(c) maintaining the temperature of said material at or above its melting point and injecting said heated material into the heated mold cavity;

(d) uniformly heating the mold cavity to a temperature of between approximately 170° F. and approximately 325° F. to cause the acrylic resin material to flow uniformly between the matrices;

(e) uniformly cooling the mold cavity to a temperature of less than approximately 150° F. whereby the shape of the groove pattern of the data transcription band precisely conforms to the shape of the groove pattern formed in inverse sense on the matrices, the width, depth and angle of the grooves of the groove pattern being faithfully replicated.

12. A method of forming data transcription bands comprising a multiplicity of grooves on a record element by injection molding a moldable plastic material selected from the group consisting of styrene and acrylic resin at elevated temperature in a mold cavity at elevated temperature having the required groove pattern of the data transcription bands, comprising the steps of:

(a) heating the plastic material to a temperature at or above its melting point;

(b) uniformly heating the mold cavity to a temperature greater than approximately 140° F.;

(c) maintaining the temperature of said material at or above its melting point and injecting said heated plastic material into the heated mold cavity;

(d) uniformly heating the mold cavity to a temperature of between approximately 170° F. and approximately 325° F. to cause said plastic material to flow uniformly throughout the mold cavity;

(e) uniformly cooling the mold cavity to a temperature of below approximately 150° F. whereby the shape of the data transcription bands on the record element will precisely conform to the shape of the groove pattern of the mold, the width, depth and angle of the grooves of the groove pattern of the mold being precisely and faithfully replicated on the record element; and (f) removing the recording element from the mold cavity.

13. A method as defined in claim 12 in which subsequent to the injection of said heated plastic material, the mold cavity is heated to a temperature of between approximately 170° F. and approximately 325° F. in a time period of between approximately five and seven seconds.

14. A method as defined in claim 13 in which subsequent to said mold cavity reaching a temperature of between approximately 170° F. and approximately 325° F., said mold cavity is uniformly cooled to a temperature of between approximately 130° F. and approximately 140° F. in a time period of approximately eight seconds.

* * * * *